Figure 1:
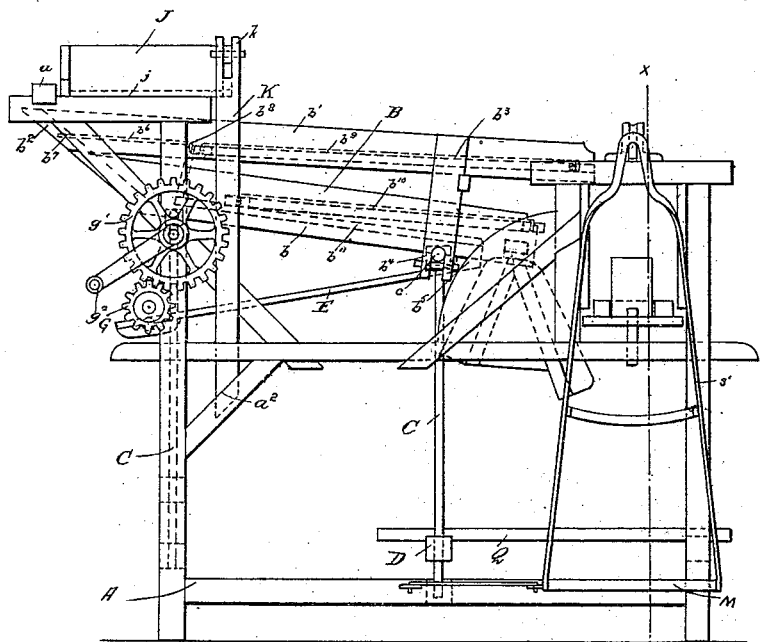

(No Model.) 2 Sheets—Sheet 1.

J. JOUBERT.
POTATO SEPARATOR.

No. 467,177. Patented Jan. 19, 1892.

Witnesses:
J. D. Ducharme
G. X. Malo

Janvier Joubert
Inventor
per: J. Emile Vanier
Attorney (No Model.) 2 Sheets—Sheet 2.

J. JOUBERT.
POTATO SEPARATOR.

No. 467,177. Patented Jan. 19, 1892.

Witnesses:
J. D. Ducharme
F. X. Malo

Janvier Joubert
Inventor
per J. Emile Vanier
Attorney

UNITED STATES PATENT OFFICE.

JANVIER JOUBERT, OF CÔTE ST. MICHEL, CANADA.

POTATO-SEPARATOR.

SPECIFICATION forming part of Letters Patent No. 467,177, dated January 19, 1892.

Application filed March 23, 1891. Serial No. 386,095. (No model.)

*To all whom it may concern:*

Be it known that I, JANVIER JOUBERT, a citizen of the Dominion of Canada, residing at Côte St. Michel, in the county of Hochelaga and Province of Quebec, Canada have invented certain new and useful Improvements in Potato-Separators; and I do hereby declare the following to be a full, clear, and exact description of the invention, such as will enable others skilled in the art to which it appertains to make and use the same.

My invention has reference to that class of potato-separators which accomplish the sorting by means of sieves having different-sized meshes, the potatoes being made to pass over their surface, the sieves being in any number required, made so as to be changeable. Moreover, I have arranged the apparatus so that the potatoes can be weighed, and I have also provided a special box or hopper having a sieve for bottom, which has for its object to break off all germs or growths with which potatoes are sometimes covered in the springtime when kept in cellars all winter.

The object of my invention is to provide a mechanical potato-separator having many advantages over those now in use and being of easy operation and inexpensive.

Referring to the drawings, similar letters refer to similar parts throughout the several views.

Figure 2:
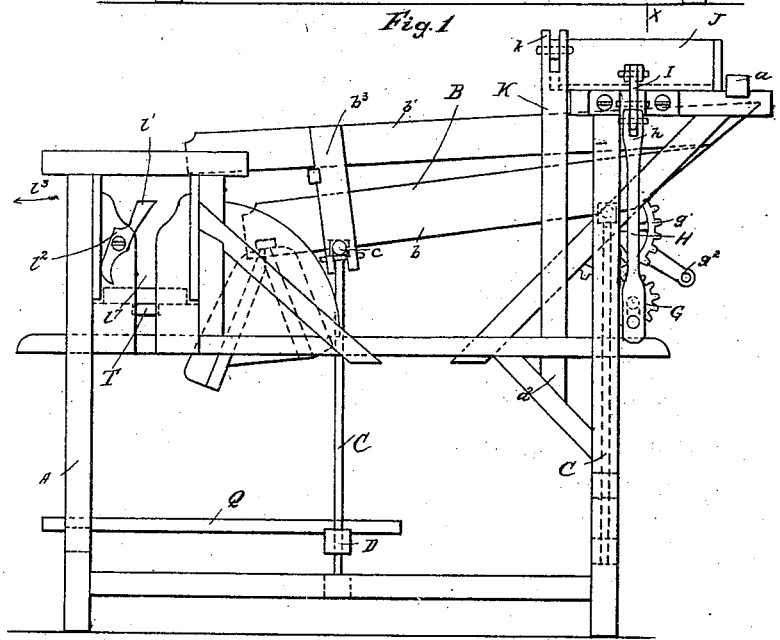
Figure 3:
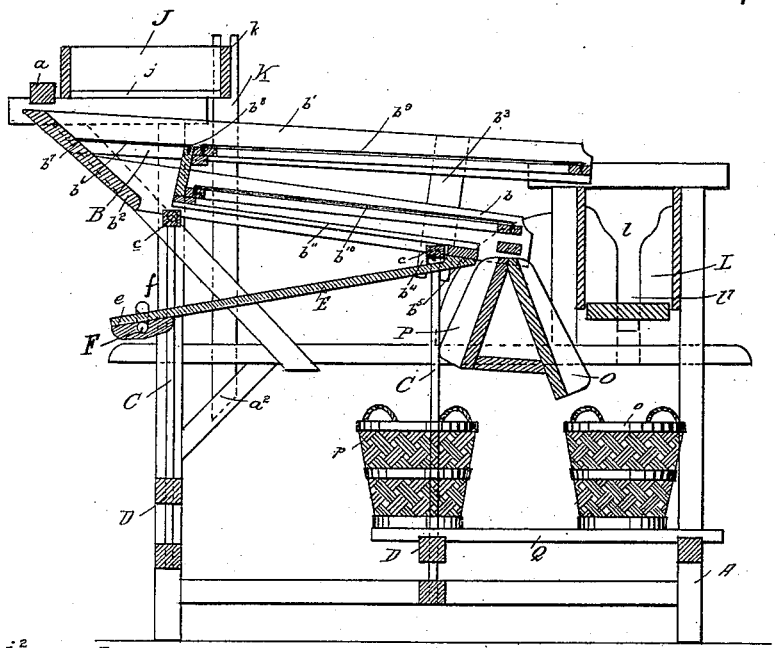
Figure 4:
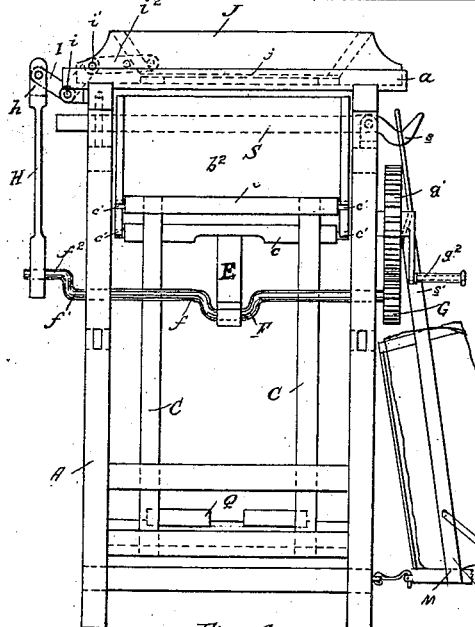
Figure 5:
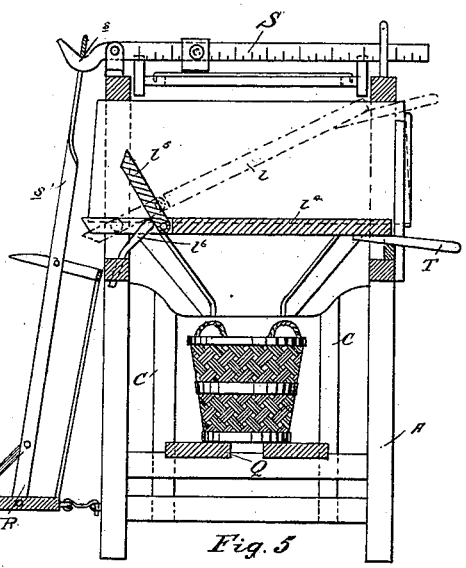

Figure 1 is a side elevation. Fig. 2 is also a side elevation, but of the opposite one to the view given in Fig. 1. Fig. 3 is a longitudinal section; Fig. 4, a front view, and Fig. 5 a section through line X X of Fig. 1.

A is the frame of my machine, made out of wood or any other suitable material, and which serves to support the sieve-holder B, composed of the two portions $b$ and $b'$, which have the same front $b^2$ and are joined to one another in the rear by means of the two pieces $b^3$, this holder B being held up on top of the four flexible uprights C, which act as springs, as explained hereinafter, and which are joined to the frame A, as shown at D in Fig. 3, and also have their upper extremities capped with the transverse pieces $c$, which have their extremities turned off, so as to form short journals $c'$, Fig. 4, the latter being placed in the bearings $b^4$, provided on the lower extremities of the pieces $b^3$.

To the under part of the portion $b$ of the holder B at $b^5$ is rigidly attached the flexible connecting-rod E, whose extremity $e$ is secured to the crank F in any suitable manner, of the shaft $f$, which is made to rotate by means of the pinion G, gear-wheel $g'$, and crank $g^2$. The end $f'$ of the shaft $f$ is provided with the crank $f^2$, to which is joined the connecting-rod H, as shown in Fig. 4, and whose extremity $h$ is secured to the bell-crank I, which is pivoted at $i$ and joined to the box or hopper J at $i'$ through the medium of the links $i^2$. (Shown in dotted lines in Fig. 4.) Now potatoes that are covered with germs are put into this hopper J, which is supported on top of the frame A, as shown in the drawings, and held in position by means of the piece $a$ and the two flexible uprights K, rigidly joined to the frame A at $a^2$, their other extremities $k$ being joined to the hopper J, as shown in the drawings, and as the bottom of this box or hopper J is formed by means of a sieve $j$, having large enough meshes to let all the potatoes go through, the jostling they get and the passing through the sieve break off all the growths with which the potatoes are covered in the spring, the former passing right through the sieve $b^6$, which is merely composed of longitudinal wires stretching from $b^7$ to $b^8$, and fall on the ground or floor on which the separator is placed. However, when the potatoes have not begun to sprout the hopper J is dispensed with and is taken off the apparatus entirely, the potatoes being thrown on the sieve $b^6$ directly with a shovel or anything else, and, the separator being put in motion by means of the crank $g^2$, they roll down on the sieve $b^9$, the one $b^6$ only having for object to let most of the earth and other foreign matter sticking on the potatoes fall through direct, the remainder falling through as they descend on the sieve $b^9$; but, as this sieve is so made as to let all except the largest-sized potatoes pass through, the latter roll down into the space L onto the inclined board $l$ (shown in dotted lines in Fig. 5) and fall into a bag $m$, placed on the small platform M, Figs. 4 and 5, while the next size is separated by means of the sieve $b^{10}$ and run down the chute O into the basket or other receptacle $o$, and, lastly, the smallest size fall onto the sieve $b^{11}$, which is formed of longitudinal strips of wood. This is used instead of wire, for the simple reason that the wire sieves get distorted and some meshes enlarged, so that potatoes would fall on the ground. However, the potatoes on this sieve $b^{11}$ fall down the chute P into the receptacle $p$, the latter, as well as the one $o$, being placed on the platform Q.

As can be seen, I only make use here of three separating-sieves; but, however, a larger number could be inserted. All that would be necessary to do would be to provide extra chutes; but the separation into three grades is generally considered sufficient. Of course it is useless to say that these sieves $b^9$ and $b^{10}$ are changeable, so that they can be made to suit.

The motion of my apparatus is greatly helped by the use of the flexible supports C and K and connecting-rod E, for when they are put out of their normal positions they tend to retake them as a spring would, they acting similarly, and if the crank $g^2$ should be let go they would do so. Consequently it is only necessary to make an effort to turn the crank $g^2$ a small amount more than half a circumference—in fact, just enough to get the crank F off its dead-center—and the springs or uprights C and K, with the connecting-rod E, would finish the revolution in virtue of the amount of work which would have been stored up by the effort of the operator on the crank $g^2$. This effort, being intermittent, is less exhausting than a continual one. Now the largest potatoes falling into the bag $m$, as explained above, operate the scale R, for the platform M is supported on the scale-beam S at $s$ by means of the hanger $s'$, and as this scale is set at any desired weight, generally ninety pounds, however, (the standard weight of a bag of potatoes,) the instant that weight is reached the end $s$ of the scale-beam S is pulled down and one of the operators takes hold of the handle T of the movable incline $l$ and, pushing the end $l'$ of the catch $l^2$ in the direction $l^3$, disengages it and brings it in the position $l^4$, (shown in Fig. 5,) this operation raising up the piece $l^5$, for on the piece $l$ descending the rigid piece $l^6$ pushes against the door $l^5$ and raises it up in the position shown in Fig. 5, this having for object to form a receptacle for the potatoes, which continue to fall into the compartment L. The space $l^7$ being too small for the passage of any potatoes, there is no loss through it, and as another empty bag $m$ is placed in position the handle T is raised and the incline $l$ takes the position shown in dotted lines in Fig. 5, the door $l^5$ dropping by gravity into its normal position, it being supported by the piece $l^6$.

Having described my invention, what I claim, and desire to secure by Letters Patent, is—

1. In a potato-separator, the combination, with a sieve, of a receptacle at one end of the sieve, the pivoted inclined board $l$, forming the bottom of the said receptacle and provided with the pivoted door $l^5$, and a support for raising the said door when the inclined board is in its lower position, substantially as and for the purpose set forth.

2. In a potato-separator, the incline board $l$, having the handle T and door $l^5$, catch $l^2$, and piece $l^6$, substantially as described, and for the purposes set forth.

In testimony whereof I have affixed my signature in presence of two witnesses.

JANVIER JOUBERT.

Witnesses:
J. D. DUCHORME,
JAMES LAURIN.